United States Patent
King et al.

(10) Patent No.: US 8,371,089 B2
(45) Date of Patent: Feb. 12, 2013

(54) MODULAR BUILDING SYSTEM

(75) Inventors: Jonathan King, Christiansburg, VA (US); David B. Clark, Fredericksburg, VA (US); Robert Dunay, Blacksburg, VA (US); Joseph Wheeler, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 79 days.

(21) Appl. No.: 12/781,437

(22) Filed: May 17, 2010

(65) Prior Publication Data

US 2010/0293869 A1 Nov. 25, 2010

Related U.S. Application Data

(60) Provisional application No. 61/178,687, filed on May 15, 2009.

(51) Int. Cl.
*E04C 2/38* (2006.01)

(52) U.S. Cl. ....... 52/656.9; 52/271; 52/282.3; 52/585.1; 403/295

(58) Field of Classification Search ........... 52/71, 127.1, 52/127.2, 282.1, 282.3, 585.1, 656.9, 285.4, 52/271; 403/295, 303, 314, 374.3, 374.4
See application file for complete search history.

(56) References Cited

U.S. PATENT DOCUMENTS

| | | | |
|---|---|---|---|
| 3,171,632 A * | 3/1965 | Jines | 254/104 |
| 3,253,847 A * | 5/1966 | Webster | 403/295 |
| 3,528,691 A * | 9/1970 | Matich, Jr. | 403/356 |
| 4,002,261 A * | 1/1977 | Litchfield | 220/683 |
| 4,011,706 A * | 3/1977 | Dupree | 403/231 |
| 4,407,603 A * | 10/1983 | Lundgren | 403/370 |
| 4,598,443 A * | 7/1986 | Ostling et al. | 24/136 R |
| 5,411,782 A * | 5/1995 | Jarvis et al. | 428/57 |
| 6,536,168 B1 * | 3/2003 | Cugini et al. | 52/220.2 |
| 2004/0062600 A1 * | 4/2004 | Jackson | 403/382 |

FOREIGN PATENT DOCUMENTS

GB 2062159 A * 5/1981

* cited by examiner

*Primary Examiner* — Brian Glessner
*Assistant Examiner* — Adam Barlow
(74) *Attorney, Agent, or Firm* — New River Valley IP Law; Michele L. Mayberry

(57) ABSTRACT

The present invention relates to the field of modular building systems. Embodiments of the invention include, a modular building system comprising planar sheets of material and moment connections, which are combined with tool-less or limited tool assembly mechanisms and can be used, for example, as spatial partitions, platforms, structural supports, or supports for articles. Specific embodiments of the invention provide structures having a seemingly homogenous, flowing ribbon structure. One embodiment of the invention provides an exhibition support system comprising: (a) at least two planar support members comprising: (i) a top panel with a top planar surface; (ii) a parallel bottom panel with a bottom planar surface; and (iii) multiple walls disposed lengthwise between the panels; wherein the panels and walls define interior hollow cells with inner surfaces and a selected inner cell height and inner cell width; and (b) at least one moment connection with two elongated members: (i) disposed at an angle of orientation relative to one another; and (ii) having a height or width to allow for a pressure fit within one of the cells along the inner cell height or width of the planar member when inserted therein; whereby structural support for the system is internal and is provided lengthwise within the planar support members at the inner surfaces of the cell that interfaces with the elongated members when inserted therein.

4 Claims, 11 Drawing Sheets

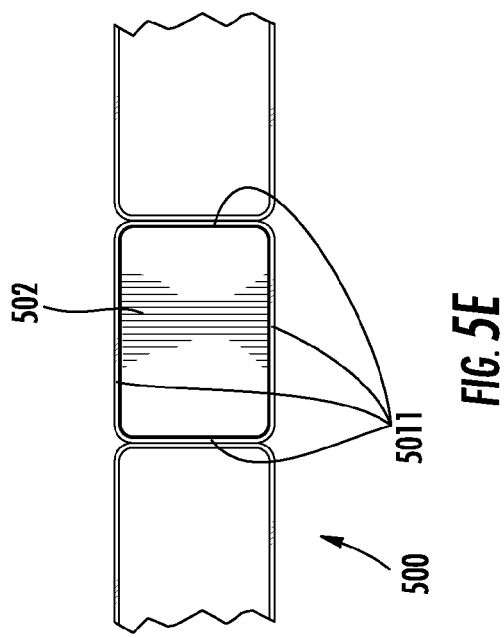
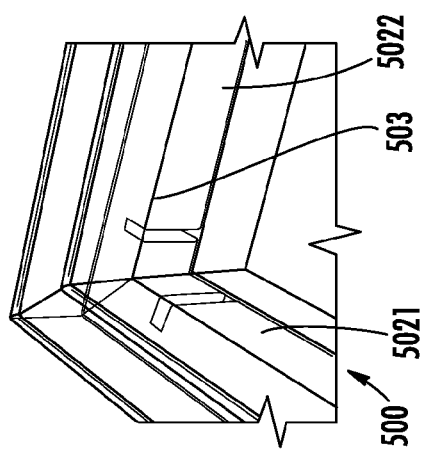
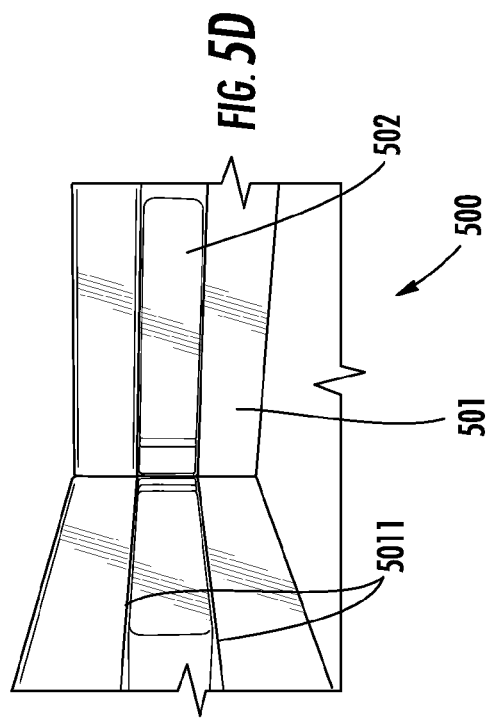
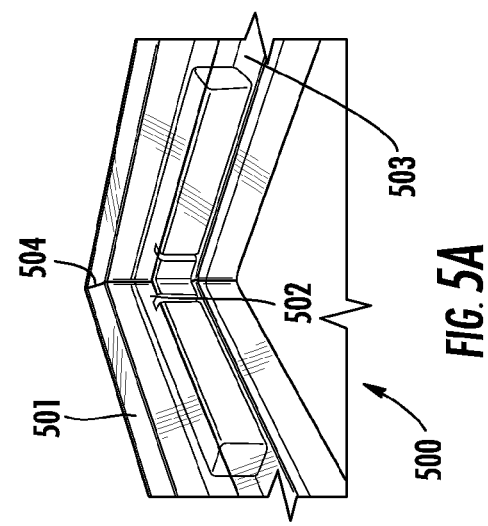
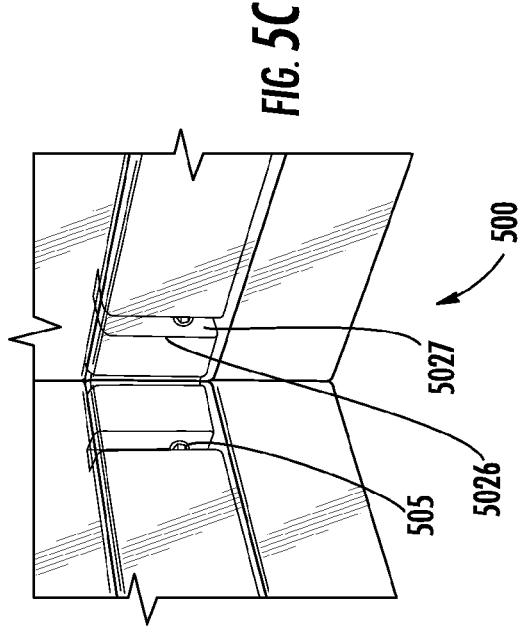

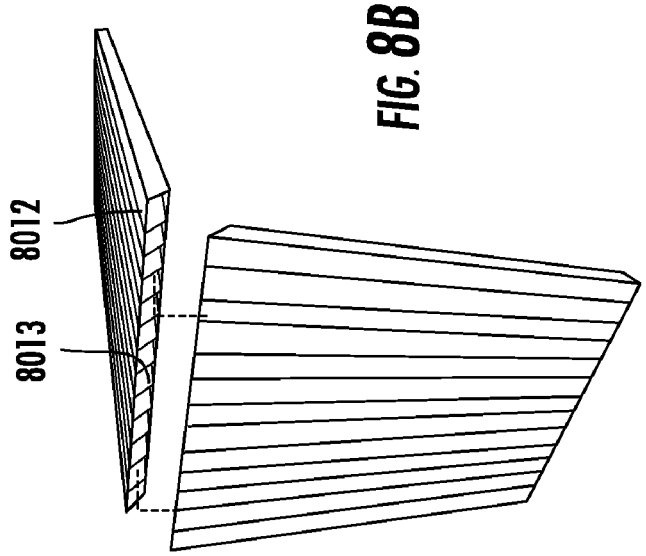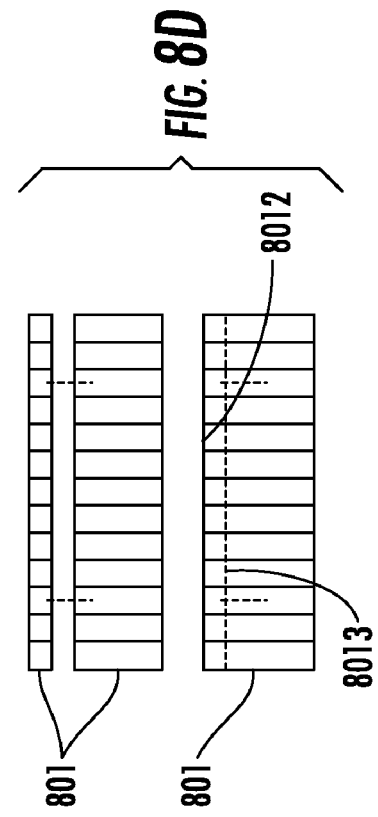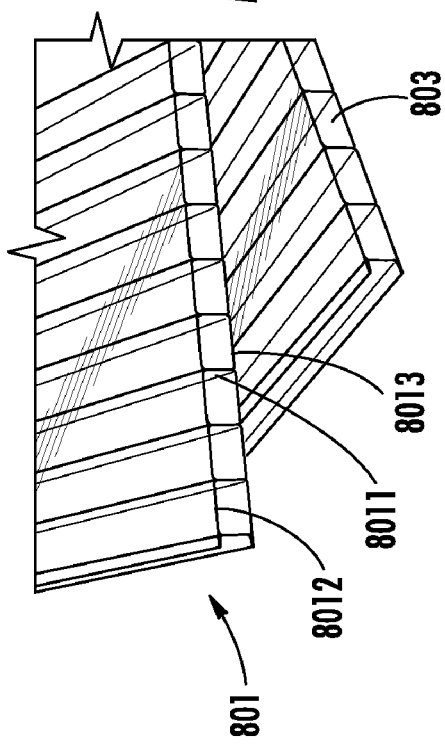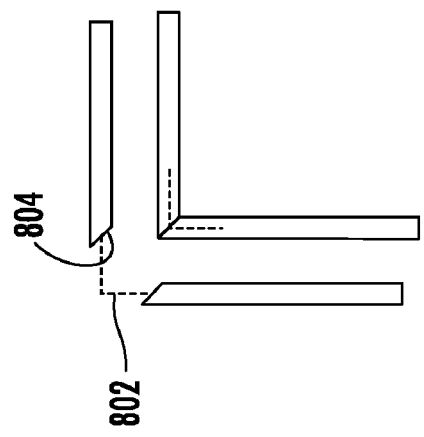

MODULAR BUILDING SYSTEM

CROSS-REFERENCE TO RELATED APPLICATIONS

This application relies on the disclosure of and claims the benefit of the filing date of U.S. Provisional Application No. 61/178,687, filed May 15, 2009, the disclosure of which is incorporated by reference herein in its entirety.

BACKGROUND OF THE INVENTION

1. Field of the Invention

The present invention relates to the field of modular building systems. Embodiments of the invention include, a modular building system comprising planar sheets of material having an interior cellular configuration and moment connections, which are combined by pressure fit with tool-less or limited tool assembly mechanisms and can be used, for example, as spatial partitions, platforms, structural supports, or supports for articles. Specific embodiments of the invention provide structures having a seemingly homogenous, flowing ribbon structure.

2. Description of the Related Art

There is a need in the field of building systems to provide a modular system that is quick and easy to assemble, requires few or simple tools to no tools, and is just as simple to disassemble. Platforms, shelters, spatial dividers, and support structures to name a few could all benefit from an improved modular building system.

For example, in disaster relief situations where temporary housing is needed it is critical to be able to respond quickly to those in need by providing structurally sound shelters. In construction, however, quick and simple usually results in lower quality and/or strength of the assembled product. Further, it would be advantageous to be able to re-use the materials by having a modular system that can be disassembled without damaging or destroying the components of the system. The use of external brackets and screws or clamps can damage the surface of the building materials rendering the materials unusable even after the first use.

Current modular construction systems using panels of sheet material and specialized connectors or brackets are typically difficult and time consuming to assemble. One way to avoid using specialized connectors for these modular systems is to substitute the brackets, connectors, and related hardware with strips of adhesive tape. Use of adhesive tape strips, however, compromises or sacrifices the overall strength of the constructed system. In particular, the tape is not very strong and any strength it provides to the system is external and lies along the seam.

Another disadvantage of existing systems exists in the area of exhibiting products for display, such as at trade shows. Exhibitors are given access to an exhibition area only a short time prior to the show to be able to set up their exhibits. Some locations even require the hiring of a union representative for installing the support systems used to display the products if tools such as a hammer, drill or screwdriver are needed, which unnecessarily adds to the exhibitor's overall cost for the show. Thus, modular display systems that can be assembled with no tools or merely an allen wrench would be highly desired. Further, in exhibition-type applications it would be additionally desirable to have a display system that is aesthetically pleasing, especially one which provides a surface for displaying products that appears to be a continuous surface and/or appears to be a single structure instead of modular.

In light of the above-described issues, the present invention provides modular building systems with few parts, which can be assembled and disassembled with few simple tools or no tools, which can be used multiple times without damaging the surface of the main building components, and which provide strong, rigid structures having an internal means of support.

SUMMARY OF THE INVENTION

Embodiments of the invention include, among other things, exhibition systems, demountable structural systems, and scalable modular construction systems, which can be assembled and disassembled quickly and easily and without tools altogether, without specialized tools, or with only minimal tools, such as a mallet or allen wrench. The building systems include at least two planar members and at least one moment connection joined in a manner that provides a rigid supportive structure and/or spatial divider having a surface that appears continuous throughout the structure.

Preferred embodiments of the invention provide building kits comprising at least two planar or tubular members and at least one moment connection capable of being joined in a manner that provides a rigid supportive structure and/or spatial divider having a surface that appears continuous throughout the structure.

Included in embodiments are planar, extruded cell, polycarbonate members and a set of individual moment connections capable of being combined to form a seemingly homogenous ribbon-looking structure.

The planar or tubular members and moment connections can be joined together by way of a pressure fit, tool-less connection to arrange the planar material in a series of vertical, angular, and horizontal elements forming three-dimensional spatial "ribbons" that provide elevated, structural platforms for supporting objects on display.

Specific embodiments include: an exhibition support system comprising: (a) at least two planar support members comprising: (i) a top panel with a top planar surface; (ii) a parallel bottom panel with a bottom planar surface; and (iii) multiple walls disposed lengthwise between the panels; wherein the panels and walls define interior hollow cells with inner surfaces and a selected inner cell height and inner cell width; and (b) at least one moment connection with at least two elongated members: (i) disposed at an angle of orientation relative to one another; and (ii) having a height or width to allow for a pressure fit within one of the cells along the inner cell height or width of the planar member when inserted therein; whereby structural support for the system is internal and is provided lengthwise within the planar support members at the inner surfaces of the cell that interfaces with the elongated members when inserted therein.

The support systems of embodiments of the invention can include planar or tubular members wherein the top or bottom surfaces of the members are not a means for connecting the support members themselves, e.g., with external brackets and screws inserted into the exterior face of the panels or tubes.

Preferably, the support and building systems according to the invention comprise cellular polycarbonate (CPC), or a material geometrically similar. Many variations exist for the configuration of the cells of the planar material, including square, rectangular, triangular, circular, or honeycomb shapes. The support material can be planar, tubular, multi-celled, or single-celled members.

The planar or tubular members can be mitered at their ends to facilitate precise abutting of the support members connected by the moment connections. A preferred embodiment includes planar or tubular support members which are mitered for connecting them at a 90 degree angle relative to each other.

Preferred systems of the present invention include systems wherein the elongated members of at least one moment connection comprise means for adjusting the pressure fit. Further, any system described in this specification can be modified to include at least one moment connection comprising means for adjusting the angle of orientation between the two elongated members. The systems can also comprise at least one moment connection having two elongated members at a fixed angle of orientation relative to each other.

Included in the scope of the invention are connectors for joining at least two independent structural members comprising: (a) at least two elongated leg members disposed an angular distance from one another and each having a configuration for adjusting leg width, the configuration comprising: (i) a wedge-shaped portion of the leg with two elongated surfaces that meet at an acute angle and a third surface opposite the acute angle; (ii) an integral screw which is fixed at one end in a non-threaded manner in the third surface of the wedge and is disposed at its other end within a threaded or partially threaded cylindrical cavity disposed lengthwise through a portion of the leg; (iii) whereby upon actuation of the screw the wedge is capable of being moved lengthwise along the leg to increase or decrease leg width.

Such connectors can be operably configured to provide a fixed angular distance between the elongated members, or legs. Likewise, it is equally applicable that the connectors can have an adjustable angular distance between the legs.

Further included in embodiments of the invention is a modular building system comprising: (a) at least two planar members comprising: (i) a top panel with a top planar surface; (ii) a parallel bottom panel with a bottom planar surface; and (iii) multiple walls disposed lengthwise between the panels; wherein the panels and walls define interior hollow cells with inner surfaces and a selected inner cell height and inner cell width; and (b) at least one moment connection with two elongated leg members: (i) having a height or width to allow for a pressure fit within one of the cells along the inner cell height or width of the planar member when inserted therein; and (ii) disposed an angular distance from one another and each having a configuration for adjusting leg width, the configuration comprising: (1) a wedge-shaped portion of the leg with two elongated surfaces that meet at an acute angle and a third surface opposite the acute angle; (2) an integral screw which is fixed at one end in a non-threaded manner in the third surface of the wedge and is disposed at its other end within a threaded or partially threaded cylindrical cavity disposed lengthwise through a portion of the leg; whereby upon actuation of the screw the wedge is capable of being moved lengthwise along the leg to increase or decrease leg width.

Such building systems can be operably configured whereby structural support for the system is internal and is provided lengthwise within the planar support members at the inner surfaces of the cell that interfaces with the elongated members when inserted therein.

Also included with embodiments of the invention are modular building systems comprising a connector as described in this specification, wherein the connector is operably configured for insertion into planar or tubular support members comprising an internal cellular cavity structure, wherein the elongated members of the connector have a height or width to allow for a pressure fit within one of the cells of the support member when inserted therein, whereby structural support for the system is internal and is provided lengthwise within the planar or tubular support members at inner surfaces of the cell that interface with the elongated members when inserted therein. Such modular building systems can comprise a connector having three elongated members for providing a three-dimensional system, which can be used in particular for joining support beams of a building, for example.

BRIEF DESCRIPTION OF THE DRAWINGS

FIGS. 5A-E are perspective views of an embodiment of a moment connection, which is an adjustable pressure wedge-type joint, according to the invention as installed in and joining two sheets of material.

FIGS. 8A, 8B, 8C, and 8D provide exemplary planar members.

DETAILED DESCRIPTION OF VARIOUS EMBODIMENTS OF THE INVENTION

Reference will now be made in detail to various exemplary embodiments of the invention. The following detailed description is presented for the purpose of describing certain embodiments in detail and is, thus, not to be considered as limiting the invention to the embodiments described.

Figure 1:
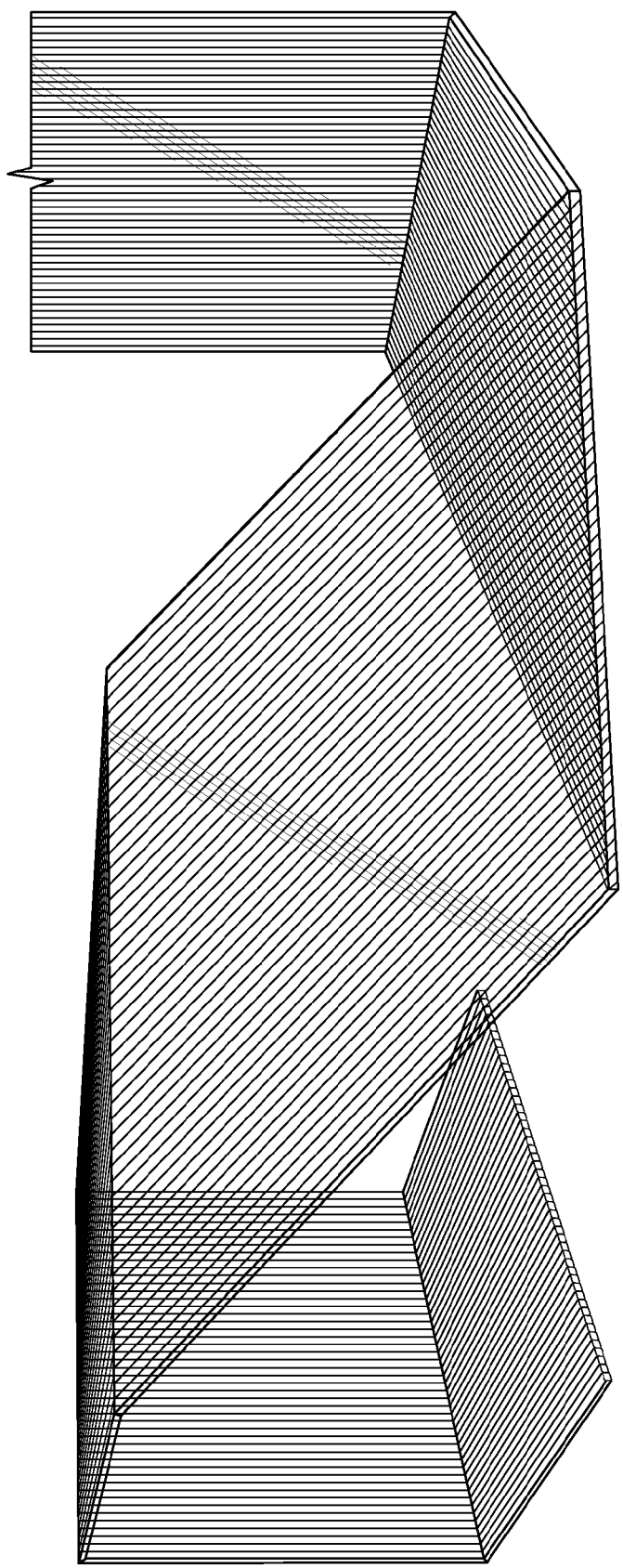
FIG. 1 is a perspective view of a polycarbonate structure that provides a display system for commercial goods or other displays, which is pieced together using adhesive tape seams (prior art).

FIG. 1 is a perspective view of a polycarbonate structure that provides a display system for commercial goods or other displays. The structure is a building system comprising five planar panels joined together with strips of adhesive tape to provide a display for articles, here furniture. The system shown does not contain the modular building system component joint connections of the invention, and is cumbersome to construct on site and difficult to deconstruct for moving and storage.

The joint connections of the invention can be used as a convenient means of connecting sections of a ribbon structure such as that shown in FIG. 1. The use of the joint connections of the invention, rather than the seams (adhesive tape strips) shown in FIG. 1, can greatly simplify the installation, deconstruction, and storage of such a display system. Embodiments of the invention allow the system to be assembled as modular sections rather than a single cohesive structure. For example, the building system can comprise five planar panels joined together using multiple moment connections, including right-angle and skewed-plane moment connections to name a few. Such a structure is seemingly continuous with inflection points formed by mitered edges of polycarbonate sheet material abutting closely by way of internal moment connection joints. Structures assembled with components of the invention have sufficient rigidity to be able to support objects on the surfaces of the planar material which act as platforms.

The planar material can be made of any type of material, including metal, wood, plastic, alloy, glass, cellular polycarbonate (CPC), etc., so long as it provides a surface for supporting objects, which is typically but not necessarily a planar or generally flat surface, and the interior of the panels comprises hollows, voids, or a cellular structure. The panels used for example in an exhibition system can be extruded or co-extruded linear celled polycarbonate sheet. Such material is also referred to as multi-walled polycarbonate sheets or hollow polycarbonate. This sheet material can be cut to any size and is available with various cellular dimensions that provide scalability to the system. This material can be cut to the desired overall ribbon panel width by cutting the sheet lengthwise and parallel to cellular direction, e.g., along a cell wall. At prescribed lengths the material can be cut at a miter across the cell openings to expose a series of open-ended cells. The angle of cut is determined by the desired position of the specific planar elements. Depending on which moment connection is chosen, the miter and cut angle can accommodate any angle and direction. The mitered intersection of planar elements allows for a clean ribbon that appears continuous in space as it provides both spatial division and structural support for the exhibited objects.

Linear cell extruded polycarbonate sheet material is preferred, for example, for exhibiting products at a trade show. The systems of embodiments of the invention, however, are not limited to this material. Indeed, any material that possess or that can be modified to possess a marginally to completely closed cell with at least one open end can be used with the system. Potential planar members (otherwise referred to as spanning or ribbon material in this disclosure) also include, but are not limited to: pipe section of various shape, extrusion with interior void, any material with similar extruded cellular characteristics such as the cellular polycarbonate.

Another component of the exhibition system is a structural moment connection that joins the planar material. In embodiments, this connection is made of water-jet cut aluminum but is also demonstrated in several additional materials. The nature of this embodiment provides a rigid, angle specific, pressure fit unit. Each end section is dimensioned to fit tightly into the exposed cell of the mitered polycarbonate sheet. Relief is given to the interior and exterior corners of the bracket to allow clean meeting of the planar elements. This connection has also been demonstrated in versions that accommodate various materials and adjustable angles, both in the mitered joint and direction of ribbon travel. This connection can accommodate various cell dimensions through adjustability. As an option to the system, and to further enhance the continuous surface feature of the system, the mitered corner intersection between two planar members can be treated with a clear temporary adhesive strip. The strip serves as reinforcement to the mitered connection and enhances the feature that the surface of the intersecting planar materials appears as one continuous structure.

The nature of the moment connection joint allows for a connection between an open cell or series of cells through pressure created by specific dimensioning or variable force. Each varies in complexity and could become part of a system of varying adjustability that allows for a dynamic exhibition system that provides inherent structural rigidity. While related in nature to the exhibition system, it is important to note the potential for a variety of component assembled structures and the scalability provided by the joint types embodied in this specification.

Even further, both the joint and spanning/ribbon components could be made from any material, including but not limited to: all metals, alloys, plastics, and fibers including natural and man-made material and product. Additionally the material manufacturing process can vary greatly depending on the materials chosen.

The planar members and joint components that are preferred as the base building materials for an exhibition system are made using specific manufacturing techniques not necessarily required for the system to function. For example, the planar ribbon elements can be made using thermo-set plastic extrusion methods and the joint components can be prepared from single sheet water-jet cut aluminum and individual milled aluminum. It might be desirable for example for the individual joint to be molded using co-injection, or injection over molding while the spanning/ribbon elements might be pultruded, extruded, case, rolled, etc.

Figure 2:
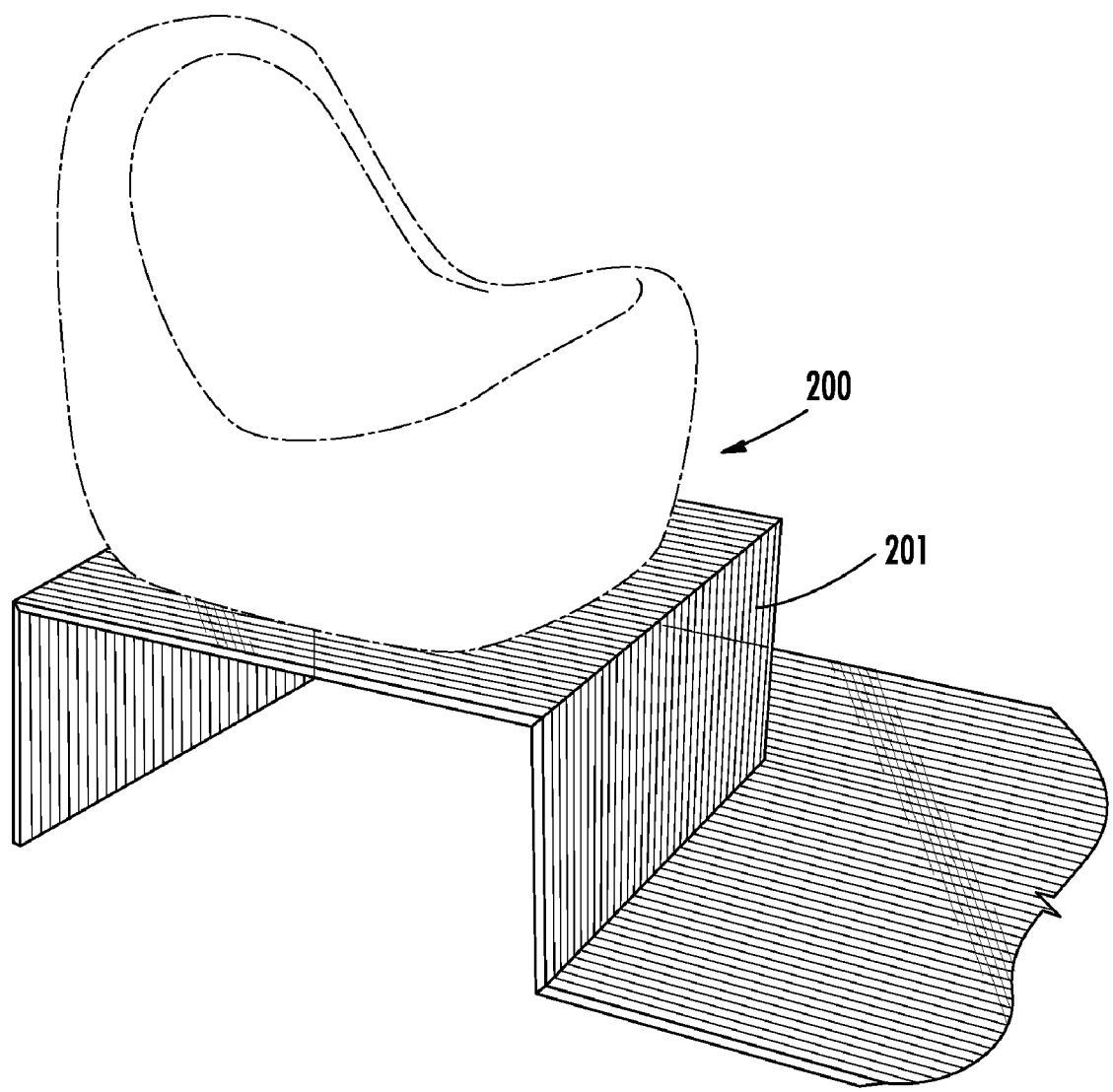
FIG. 2 is a perspective view of a polycarbonate structure that provides a display system for commercial goods or other displays, which is pieced together using adhesive tape seams (prior art).

FIG. 2 is a perspective view of a polycarbonate structure that provides a display system for commercial goods or other displays, which is pieced together using adhesive tape seams (prior art). A building system 200 according to the invention comprising at least four planar panels 201 joined together using multiple right-angle type moment connections can be used to provide a platform for displaying objects that is identical in appearance to that of FIG. 2, but which is modular and less cumbersome to assemble on site.

Figure 3:
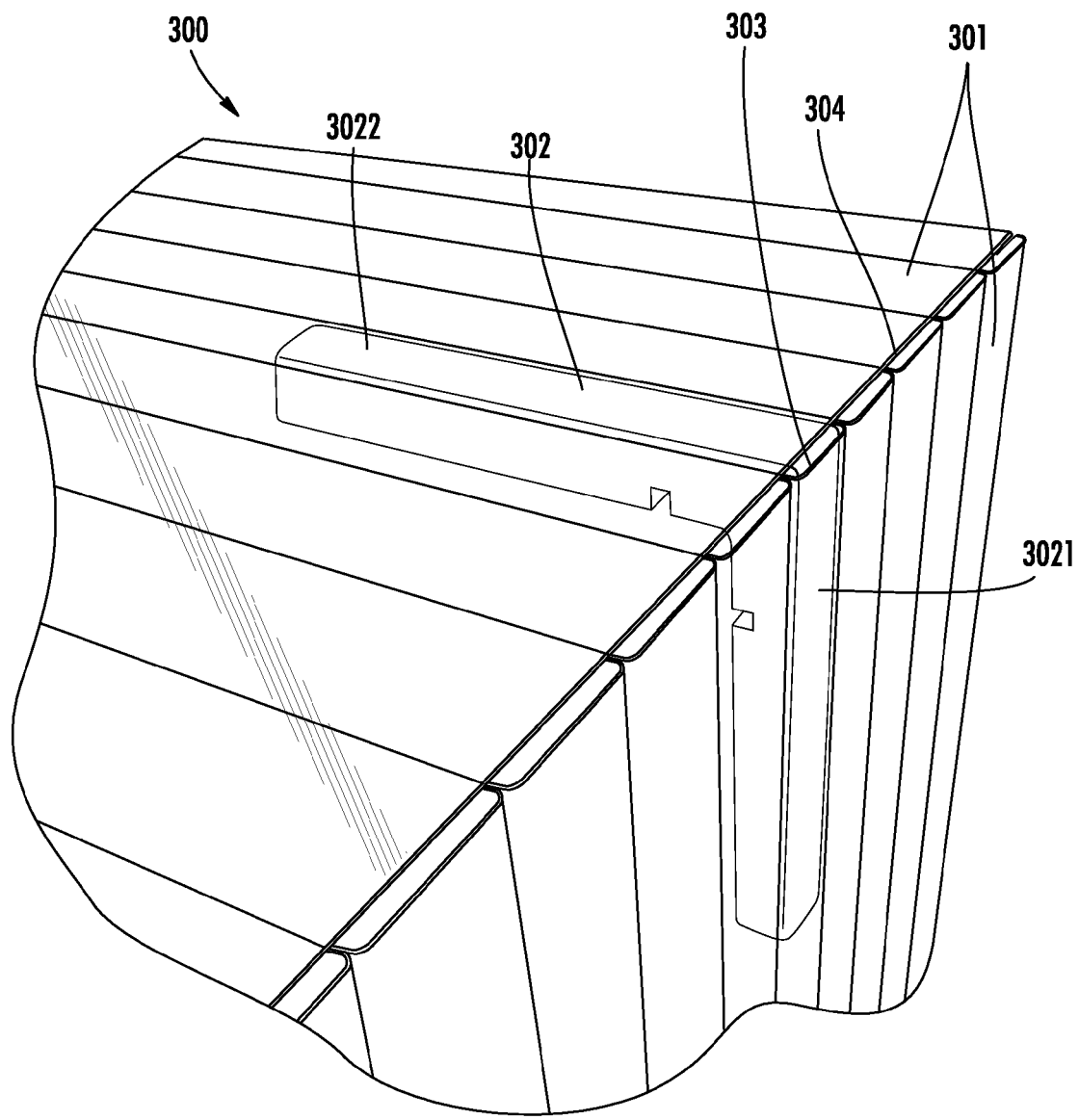
FIG. 3 provides a perspective view of a building system embodiment in which two planar panels are connected with right-angle moment connections and wherein disposition of the connections within the cells of the planar material is visible through the transparent planar material.

FIG. 3 provides perspective views of a building system 300 embodiment in which two planar panels 301 are connected with right-angle moment connections 302 and wherein disposition of the connections within the cells of the planar material is visible through the transparent planar material. To assemble the planar members 301 in a manner that provides a smooth, continuous surface, a first elongated member 3021 of a moment connection 302 with two elongated members 3021, 3022 positioned at or configured in a desired fixed position relative to one another (here, 90 degrees) is inserted into a void (cell) 303 within the planar member 301. The joint or moment connection 302 is held by pressure fit within the cell 303 of the planar member 301. The cells 303 of the planar member 301 can be drilled or the planar member extruded in a manner that provides cells with an interior surface providing a void with approximately the same dimensions as or slightly larger than the exterior surface dimensions of the corresponding moment connection to be inserted into the cell. The planar members have edges mitered 304 to allow for close abutment when assembled using the moment connections. Once the first elongated member of the moment connection is inserted into the first planar member the second elongated member 3022 of the connector is inserted into a second planar member. The planar members are then pushed further onto the elongated members to ensure close abutment of their mitered edges.

Figure 4A:
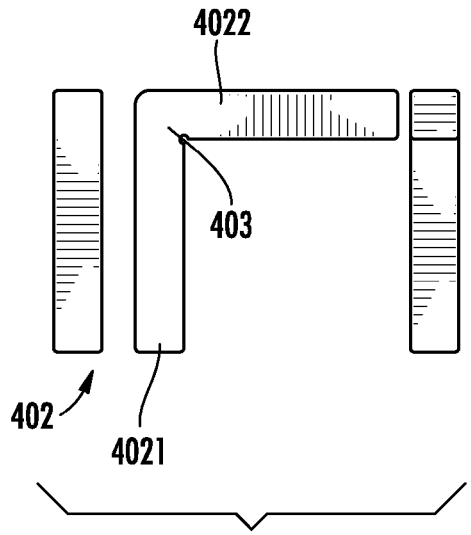
FIGS. 4A, 4B, and 4C are line drawings showing several views of three embodiments of moment connections according to the invention.
Figure 4B:
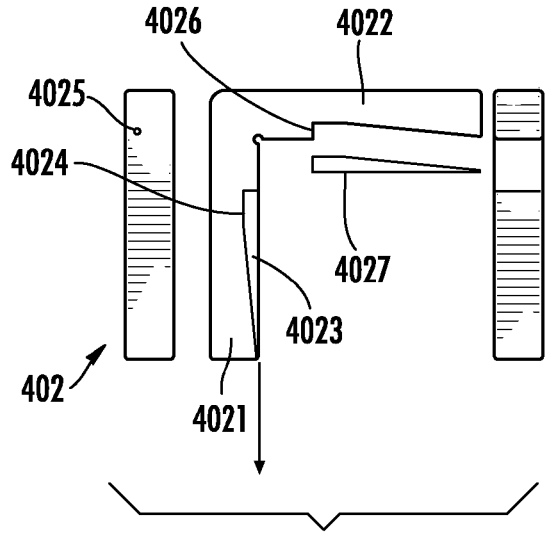
Figure 4C:
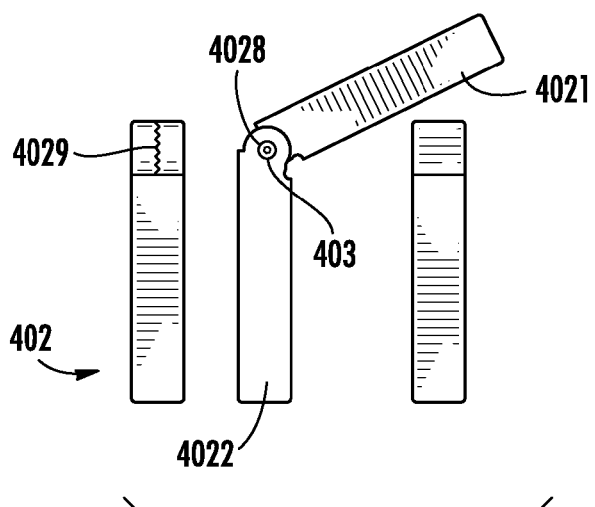

FIGS. 4A, 4B, and 4C are line drawings showing several views (from left to right in each set of figures, a back, side, and front elevation view) of three embodiments of moment connections 402 according to the invention. FIG. 4A provides a prescribed or fixed angle (right or other) moment connection 402. This connection can be constructed from a variety of materials including but not limited to: polycarbonate, ABS, aluminum, acrylic. The connectors can be configured to provide any desired prescribed angle to allow for joining of planar members at any desired angle by way of having elongated members 4021 and 4022 at a fixed desired angle. For example, a right-angle connector would have a prescribed bracket angle 403 of ninety degrees and the component statically reflects this angle. As part of the system the prescribed angle connection is the simplest and when used in planar connections can be made as a homogenous unit for ease of manufacturing (e.g., laser, water jet, or other CNC process to cut sheet material or injection molding). This could be specified to any assembly angle. The joint can be scaled or modified to accommodate a particular cell dimension of the planar materials which it is coupled with. Non-adjustable prescribed angles that allow for ribbon movement out of plane (skewed) are also included in the invention.

FIG. 4B provides an adjustable pressure, wedge joint 402. In this embodiment, the moment connection 402 is similar in nature to the prescribed right angle joint but also allows for post installation adjustability of the pressure fit between the moment connection and the internal walls or surfaces of the cell of the planar material. Each leg 4021, 4022 of the component contains a wedge 4023 along the length of the leg. The wedge fits into a corresponding cut out of the leg 4024, or the remainder of the leg is configured to accommodate the wedge so as when combined the two parts provide a complete leg. The wedge can be attached to the leg of the connector by way of a set screw (not shown) or can be free of the leg but positioned to contact a screw or push rod for providing lengthwise movement of the wedge along the leg of the connector.

A leg 4021 or 4022 of the moment connection 402 and its corresponding wedge 4023 are inserted into a cell of a planar sheet, the tension between the moment connection and the inside surface of the cell can be manipulated from outside the closed system by integral setscrew (not shown). In preferred embodiments, an integral set screw is accommodated by a channel 4025 disposed within and along the length of the leg of the component up to and emerging from the leg at the cut out 4026 portion corresponding to the wedge. The screw can be secured within the head portion 4027 of the wedge 4023 in a threaded or non-threaded manner (not shown) or of sufficient length to contact the head of the wedge.

With the leg 4021, 4022 of the moment connection 402 inserted in the cell of the planar material, the set screw can be activated to push the wedge 4023 further in a lengthwise direction into the planar member (direction of movement shown by arrow). As the wedge 4023 is pushed into the cell it acts as a shim to effectively increase the dimension of the leg with each turn of the set screw and gradually to provide a tight pressure fit within the material cell, according to a desired amount of pressure for that application. Adjustment of the tension can be performed while the moment connection is within the planar material, thus making initial insertion of the moment connection relatively effortless (even tool-less). Securing of the connection is then performed after insertion to tighten the fit between the components. This can be facilitated by providing a pin prick hole (similar in size to hole/channel 4025) in a surface of the planar member to accommodate a small rod, allen wrench, or screw driver for actuating the wedge. Similarly, the joint is released by releasing pressure on the setscrew. As the screw is adjusted the wedge moves and the leg dimension is reduced allowing for disassembly. Such an assembly allows for variations in the size of the cell cavity of the planar members without interfering with the pressure fit features of the system.

FIG. 4C provides yet another embodiment of moment connections 402 according to the invention. More particularly, as shown is a moment connection 402 with a continuously adjustable angle 403. The continuously adjustable joint allows the user to adjust the angle of the bracket preferably prior to assembly with the planar members. The angle is secured or locked in place using an integral set screw 4028. The joint allows the user to develop custom ribbon paths and offers a more adaptable assembly. In the embodiment shown, planar members can be joined together at angles ranging from 90 degrees up to 180 degrees. With slight modifications, the joint can be configured to allow for positioning of the surfaces of the planar members at any angle with respect to one another. Even further, the joint is not limited to a hinge-type joint and can be configured in a ball-and-socket type configuration to include any number of skewed orientations of the planar members relative to one another. The textured 4029 joint shown in FIG. 4C represents optional knurling or texturing to increase sheer strength of the tightened joint. This joint can be rotated then tightened to allow for angular adjustability.

Any features of the moment connections described in this specification can be intermixed from any one or more of the embodiments described. For example, combining the features of an adjustable pressure joint and the features of a continuously adjustable angle joint would allow for infinite adjustability while accommodating a varying cell dimension.

FIGS. 5A-E are perspective views of an embodiment of a moment connection according to the invention as installed in and joining two sheets of material to form a building system 500 according to the invention. As shown, the moment connection 502 provides a structural connection and structural support for the system from the inside of the planar members 501. The edges of the planar members in this embodiment are mitered 504 to provide close abutting edges of the sheets. An advantage of embodiments of the present invention is that the connectors are internal to the system and do not require means for connecting the panels that would disturb, damage, or interfere with the face (top surface of the top panel of the planar member) or the underside (bottom surface of the bottom panel of the planar member) of the system. In this way, the completed system appears to be a single unit or appears to have a flowing, continuous carpet- or ribbon-like structure, which other systems using external means for connecting the panels lack. As shown in FIG. 5B, the two elongated members 5021, 5022 of the joint are configured for insertion into a cell 503 of the structural material (whether tubular, planar (as shown), or other configuration). The elongated members are of a shape and size to allow for a pressure fit within the interior of the cell into which it is inserted. Also, as in this embodiment, the elongated members can be operably configured to adjust the degree of pressure fit within the cell once inserted. The wedge-type configuration shown here is operably configured for adjusting pressure between the components internally to the system. As shown in FIG. 5C, a set screw 505 can be actuated to push the head 5027 portion of the of the wedge into the cell away from the head of the joint 5026 to effectively increase the overall width of the leg and increase the amount of pressure fit. As shown in FIGS. 5D and 5E, a secure fit between joint 502 and cell walls 5011 of support member 501 is achieved with the wedge-type joint.

Figure 6A:
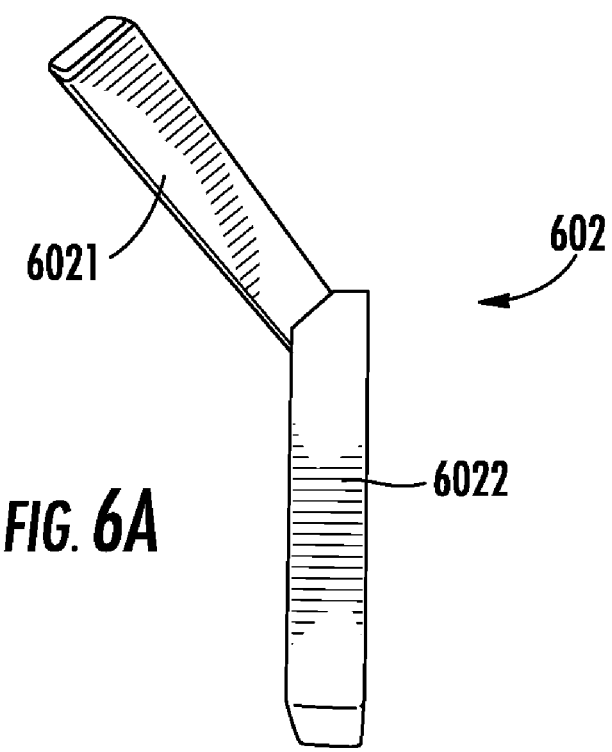
FIGS. 6A and 6B provide perspective views of an embodiment of a moment connection for joining two planar sheet materials in skewed planes.
Figure 6B:
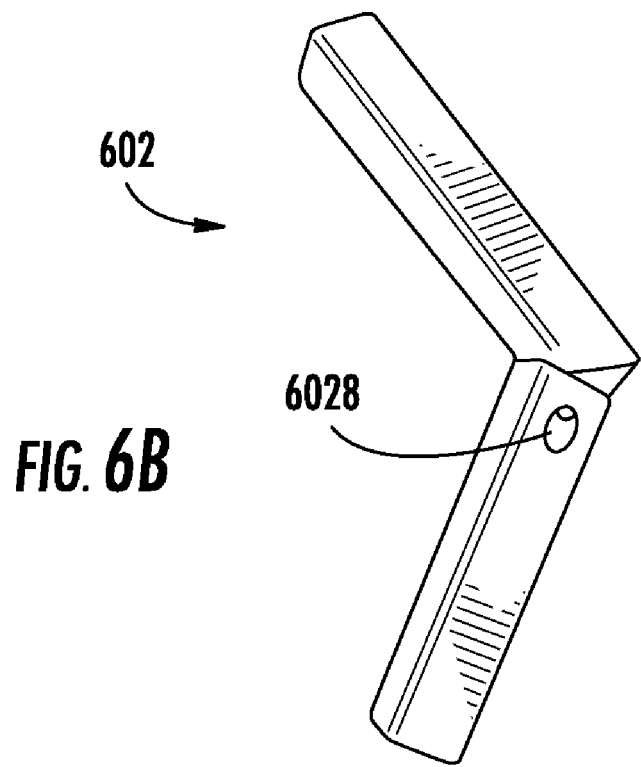

FIGS. 6A and 6B provide perspective views of an embodiment of a moment connection 602 for joining two planar sheet materials in skewed planes. In particular, an advantage of this type of joint is that it allows for planar members joined in a system to return at a non-90 degree configuration, or skewed configuration. As shown, FIGS. 6A and 6B provide views of an embodiment of a moment connection which when connected with two planar members orients the planar members in planes that are skewed with respect to one another. One embodiment of the skew-type connector comprises two elongated members 6021, 6022 joined by a bolt 6028. One or both of the elongated members preferably comprises a surface for contacting the other elongated member in a manner (when joined with a bolt) that allows for a connection between two skewed planes (referring to the planar members). This connection allows the exhibition ribbons to return on themselves and to create non-linear ribbon configurations. The connection between the elongated members can be fixed or adjustable. As shown, the connection between the elongated members is fixed at a skewed angle.

Figure 7B:
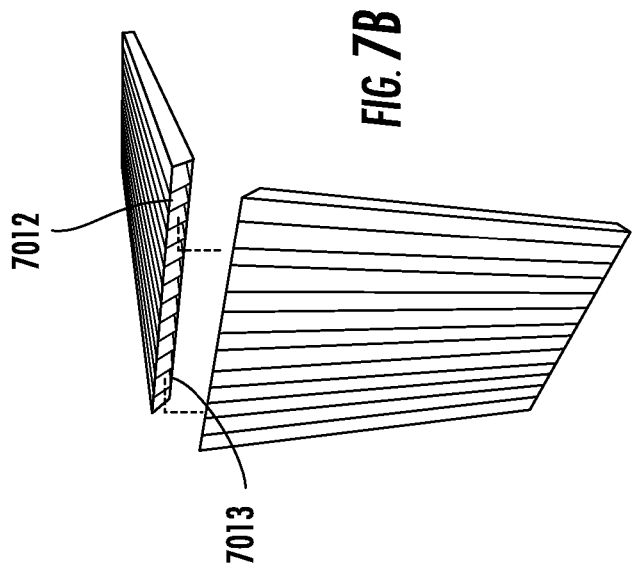
FIGS. 7A, 7B, 7C, and 7D provide exemplary planar members.
Figure 7D:
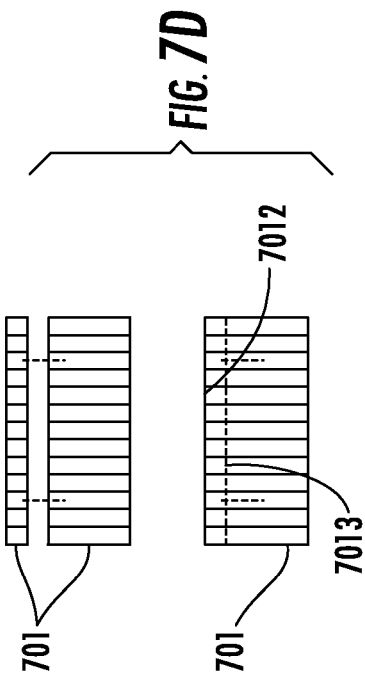
Figure 7A:
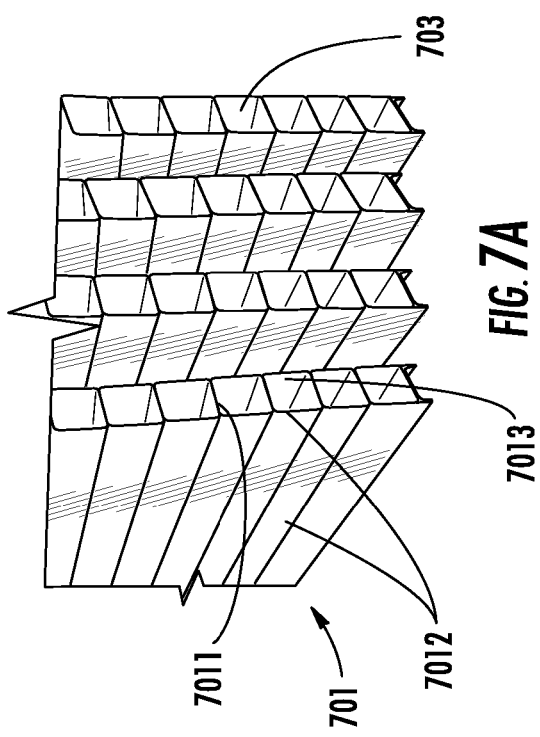
Figure 7C:
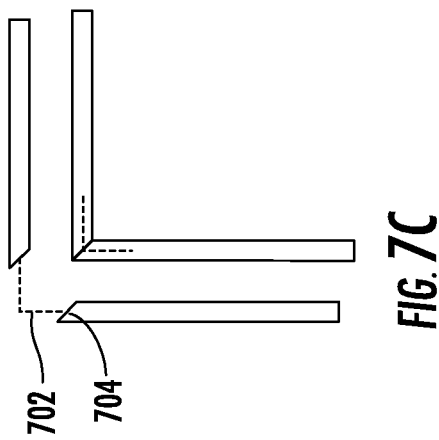
Figure 9B:
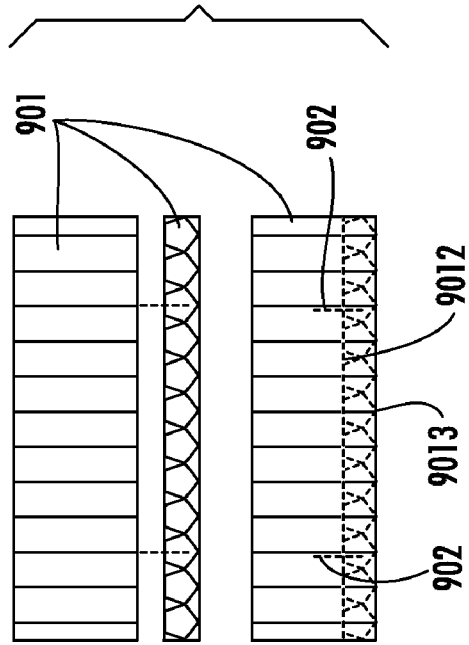
FIGS. 9A, 9B, and 9C provide exemplary planar members.
Figure 9A:
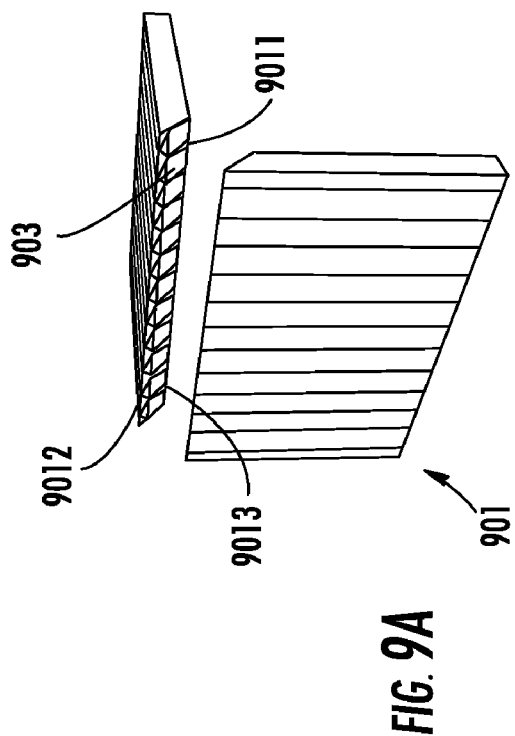
Figure 9C:
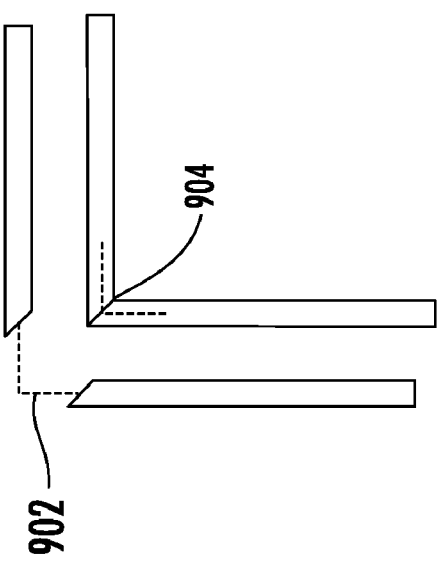

FIGS. 7A-D, 8A-D, and 9A-C provide representative examples of the structure for the support panels 701, 801, 901 that can be used according to the building systems of the invention. As shown, the planar members 701, 801, 901 generally comprise a top 7012, 8012, 9012 panel and a bottom 7013, 8013, 9013 panel. The thickness of the panels can be varied according to particular applications. For example, thicker panels may be desired to increase strength of the panels in order to be able to withstand heavier loads. Thinner panels may be desired in case lighter systems are needed, such as for systems that will be carried by hand to a particular remote location. Between the top and bottom panels are rows of walls 7011, 8011, 9011 forming internal cells 703, 803, 903 lengthwise through the planar member 701, 801, 901. Many variations of internal cell structure of the planar material can be used. For example, the cross section of the cell can be a square (FIGS. 7A-D), rectangular (FIGS. 8A-D), complex (FIGS. 9A-D), honeycomb, circular, or triangular shape. Different configurations, including more rather than fewer cells, can increase strength of the planar materials. The edges of the panels can be mitered so that the internal connector joint is covered by the panels when the joint is inserted into the cell of the sheet. The materials shown in FIGS. 7A and 8A are from Guangzhou Yuemei Plastic Industrial Co., Ltd. of China. Similar materials can be purchased from Gallina USA LLC.

Figure 10A:
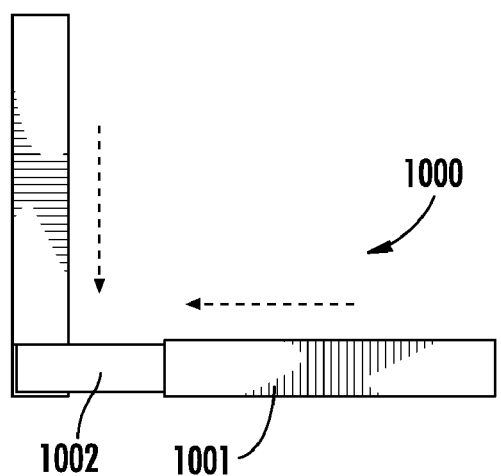
FIGS. 10A, 10B, 10C, and 10D provide an exemplary building system comprising a wedge-type connector with three elongated members, which can be used for connecting tubular members (e.g., support beams for buildings) as shown.
Figure 10B:
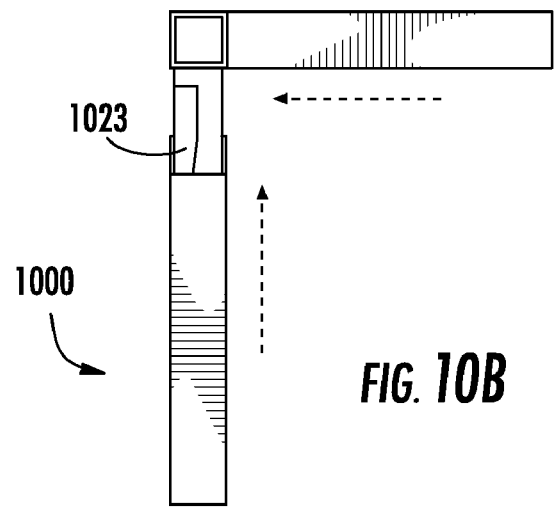
Figure 10C:
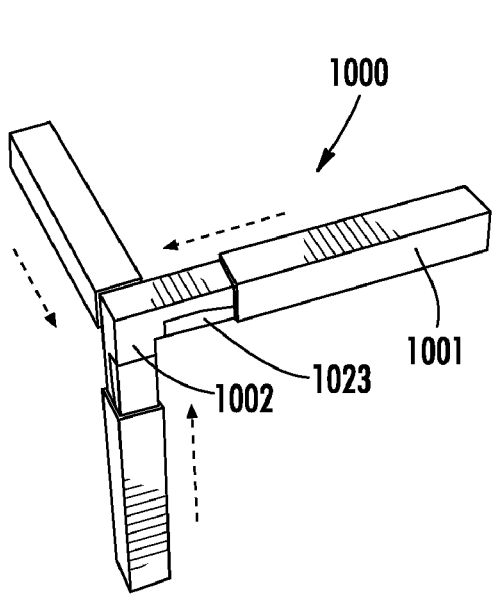
Figure 10D:
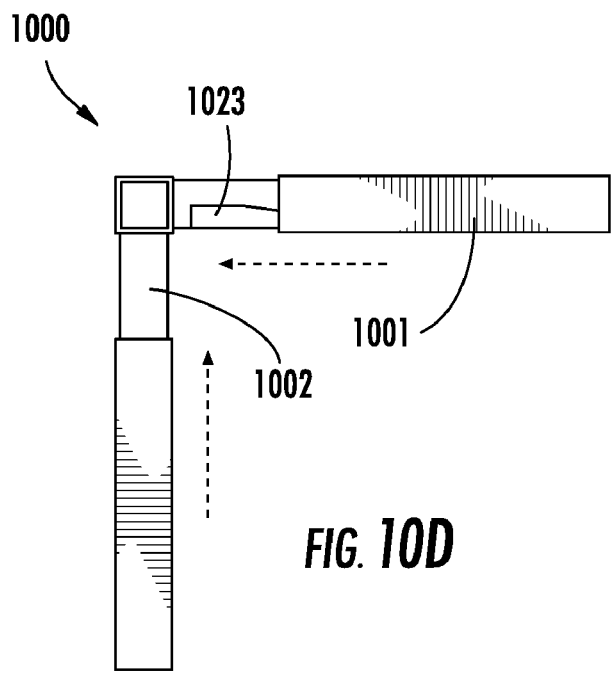
Figure 11A:
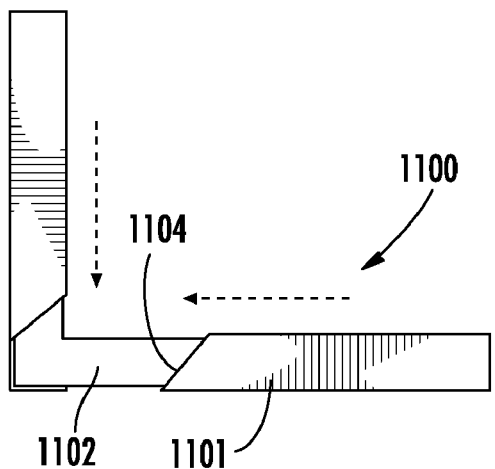
FIGS. 11A, 11B, 11C, and 11D provide an exemplary building system comprising a wedge-type connector with three elongated members, which can be used for connecting complex-mitered tubular members (e.g., support beams for buildings) to provide when joined a cohesive external appearance as shown.
Figure 11B:
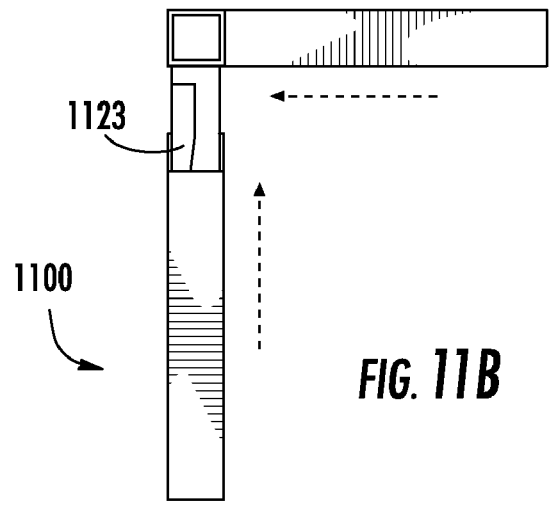
Figure 11C:
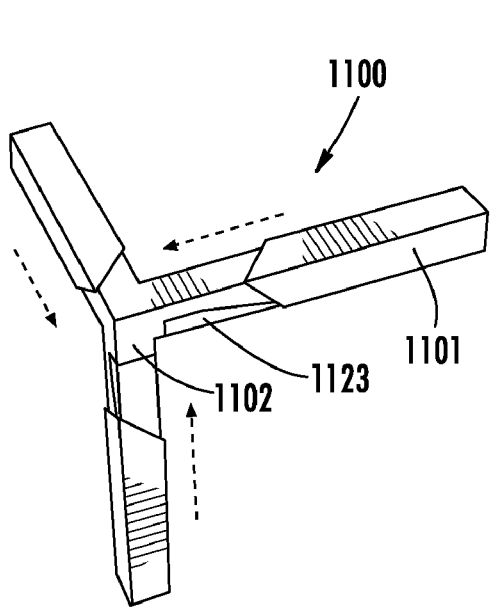
Figure 11D:
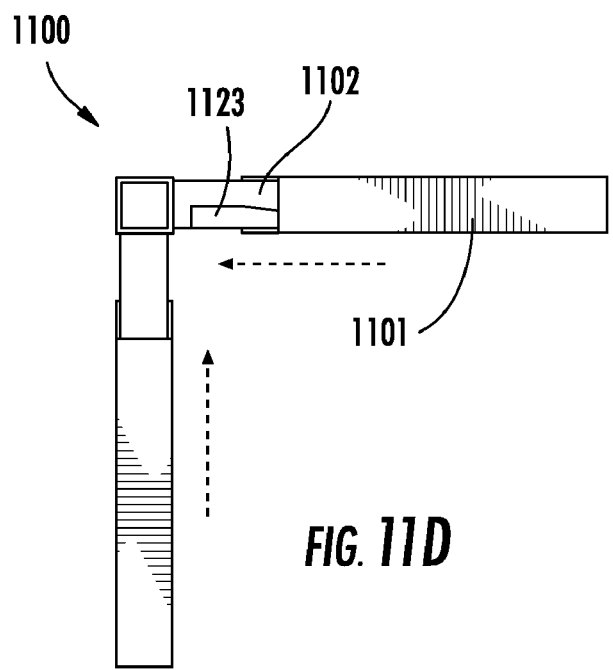

FIGS. 10A-D and 11A-D provide exemplary building systems 1000, 1100 comprising a wedge-type connector 1002, 1102 with three elongated members, which can be used for connecting three tubular 1001, 1101 members (e.g., support beams for buildings) as shown. The joints 1002, 1102 having one or more elongated members can be inserted into the cell of a tubular (shown), single-cell planar, or multi-cell planar member. With unmetered edges (FIGS. 10A-D) of the support member, part of the joint will remain exposed even after the system is constructed. FIGS. 10C and 11C show the components being constructed with the directional arrows showing relative movement of the support members 1001, 1101 onto the joint 1002, 1102. With mitered or complex mitered edges 1104 (FIGS. 11A-D), when the support members (regardless of whether tubular, planar, single- or multi-cell) are positioned on the joint, the mitered edges will abut one another to provide a seemingly no-seam appearance, as if the completed structure were a single piece and unapparent that it is in fact modular. Once inserted, the wedge-type connector joints can be adjusted to increase the pressure between the joint and the support member to a desired pressure fit. The wedge 1023, 1123 portion of the elongated members of the joint can be moved lengthwise along the leg to increase the effective width of the leg thereby increasing the amount of pressure fit.

Potential uses for the building systems of the invention vary greatly, especially as the system is applied at various scales to potentially diverse material selection. The following list is an attempt to identify potential uses, but is not intended as a limitation of embodiments of the invention. Other uses will be apparent to those of skill in the art by applying the invention similarly in diverse applications. The joints can be used to accommodate the connection of pipe, tube, and similar extrusion. Each joint can be expanded in more than two directions allowing integral moment frame connections. Potential uses may include, exhibition design, interior spatial installation, landscape design, architectural intervention, temporary and permanent structures, any situation where rapidly assembled construction methods is desired, building systems, situations in which a minimum shipping size with maximum assembled presence would be beneficial, aerospace applications, moment frame assemblies, agricultural building applications, furniture assembly, trailer coverings, rapidly deployable shelters, camping equipment, recreational furniture, recreational shelters, storage units, disaster relief shelters, mobile infrastructures, research laboratories, remote research stations, any deployable building situation, children's toy assemblies, do-it-yourself building systems, user assembled storage solutions, car ports, model stands, artist studios and studio equipment, modular shelving applications, work benches, children's play houses, office furniture, office storage, and any circumstance that calls for moment frame or integral planar connections at various scales and material. The systems can even be scaled larger (for residential and commercial building construction, where the connectors are used as beams) or smaller (for hobby or model making).

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

The invention claimed is:
1. A modular building system comprising:
    (a) at least two planar members comprising:
        a top panel with a top planar surface;
        a parallel bottom panel with a bottom planar surface; and
        multiple walls disposed lengthwise between the panels;
        wherein the panels and walls define interior hollow cells with inner surfaces and a selected inner cell height and inner cell width; and
    (b) at least one moment connection with two elongated leg members:
        having a height or width to allow for a pressure fit within one of the cells along the inner cell height or width of the planar member when inserted therein; and
        disposed an angular distance from one another and each having a configuration for adjusting leg width, the configuration comprising:

a wedge-shaped portion of the leg with two elongated surfaces that meet at an acute angle and a third surface opposite the acute angle;

an integral screw which is fixed at one end in a non-threaded manner in the third surface of the wedge and is disposed at its other end within a threaded or partially threaded cylindrical cavity disposed lengthwise through a portion of the leg;

whereby upon actuation of the screw the wedge is capable of being moved lengthwise along the leg to increase or decrease leg width.

2. The building system of claim 1, whereby structural support for the system is internal and is provided lengthwise within the planar support members at the inner surfaces of the cell that interfaces with the elongated members when inserted therein.

3. A modular building system comprising at least two planar support members each comprising an internal cellular cavity structure defined by multiple walls and hollow cells; and a connector for joining two or more independent structural members comprising:

at least two elongated leg members disposed an angular distance from one another and each having a configuration for adjusting leg width, the configuration comprising:

a wedge-shaped portion of the leg with two elongated surfaces that meet at an acute angle and a third surface opposite the acute angle;

an integral screw which is fixed at one end in a non-threaded manner in the third surface of the wedge and is disposed at its other end within a threaded or partially threaded cylindrical cavity disposed lengthwise through a portion of the leg; whereby upon actuation of the screw the wedge is capable of being moved lengthwise along the leg to increase or decrease leg width;

wherein the connector is operably configured for insertion into the planar support members, wherein the elongated members of the connector have a height or width to allow for a pressure fit within one of the cells of the support member when inserted therein, whereby structural support for the system is internal and is provided lengthwise within the planar support members at inner surfaces of the cell that interface with the elongated members when inserted therein.

4. The modular building system of claim 3, wherein the connector comprises three elongated members for providing a three-dimensional system.

* * * * *